US012305834B2

(12) United States Patent
Li et al.

(10) Patent No.: US 12,305,834 B2
(45) Date of Patent: May 20, 2025

(54) MAGNETIC CONNECTION STRUCTURE AND LIGHTING APPARATUS

(71) Applicants: OPPLE LIGHTING CO., LTD., Shanghai (CN); SUZHOU OPPLE LIGHTING CO., LTD., Suzhou (CN)

(72) Inventors: Shuchao Li, Shanghai (CN); Jianmin Xie, Shanghai (CN)

(73) Assignees: OPPLE LIGHTING CO., LTD, Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 14 days.

(21) Appl. No.: 18/380,026

(22) Filed: Oct. 13, 2023

(65) Prior Publication Data

US 2024/0060628 A1 Feb. 22, 2024

Related U.S. Application Data

(63) Continuation of application No. PCT/CN2022/088059, filed on Apr. 21, 2022.

(30) Foreign Application Priority Data

Apr. 25, 2021 (CN) ......................... 202110449608.2

(51) Int. Cl.
*F21V 21/096* (2006.01)
*F21S 8/06* (2006.01)
(Continued)

(52) U.S. Cl.
CPC ............ *F21V 21/096* (2013.01); *F21S 8/066* (2013.01); *F21V 21/35* (2013.01); *F21V 23/06* (2013.01)

(58) Field of Classification Search
CPC ........... F21S 8/00; F21S 8/066; F21V 21/096; F21V 21/34-35; F21V 23/06; H01R 13/62-6205; H01R 25/142-147
See application file for complete search history.

(56) References Cited

U.S. PATENT DOCUMENTS 5,154,509 A * 10/1992 Wulfman ............. H01R 25/147 362/648
8,436,521 B2 * 5/2013 Shim ......................... H01J 5/52 313/631
11,242,982 B2 * 2/2022 Cho ...................... F21V 21/096

FOREIGN PATENT DOCUMENTS

CN 204084003 U 1/2015
CN 208652282 U 3/2019
(Continued)

OTHER PUBLICATIONS

International Search Report of PCT/CN2022/088059 dated Jun. 28, 2022 with English translation, (6p).

*Primary Examiner* — Jason M Han

(74) *Attorney, Agent, or Firm* — Arch & Lake LLP; Shen Wang; Hao Tan

(57) ABSTRACT

The present disclosure discloses a magnetic connection structure and a lighting apparatus, wherein the magnetic connection structure includes a first connection side and a second connection side; the first connection side is provided with an anti-rotation protrusion, a connection groove, and a first adsorption element; the second connection side is provided with an anti-rotation protrusion and a second adsorption element; when the first connection side is engaged with the second connection side, the anti-rotation protrusion is inserted into the anti-rotation groove, and the second adsorption element is inserted into the connection groove and form a magnetic adsorption with the first adsorption element.

13 Claims, 7 Drawing Sheets

(51) Int. Cl.
*F21V 21/35* (2006.01)
*F21V 23/06* (2006.01)

(56) References Cited

FOREIGN PATENT DOCUMENTS

| | | | |
|---|---|---|---|
| CN | 209012885 | U | 6/2019 |
| CN | 210142781 | U | 3/2020 |
| CN | 210601224 | U | 5/2020 |
| CN | 112607648 | A | 4/2021 |
| CN | 113154292 | A | 7/2021 |
| CN | 113310001 | A | 8/2021 |
| CN | 214840315 | U | 11/2021 |
| CN | 215636695 | U | 1/2022 |
| EP | 3385614 | A1 | 10/2018 |

* cited by examiner

MAGNETIC CONNECTION STRUCTURE AND LIGHTING APPARATUS

CROSS-REFERENCE TO THE RELATED APPLICATION

This application is based upon and claims the priority of PCT patent application No. PCT/CN2022/088059 filed on Apr. 21, 2022 which claims priority to the Chinese patent application No. 202110449608.2 filed on Apr. 25, 2021, the entire contents of which are hereby incorporated by reference herein for all purposes.

TECHNICAL FIELD

The present disclosure relates to the technical field of lighting apparatus, and particularly to a magnetic connection structure and a lighting apparatus.

BACKGROUND

Track lights mainly include tracks (conductive tracks) fixed on the ceiling or walls and various lamp bodies slidable along the tracks, which can be spotlights, line lights, etc. For some magnetically conductive track lights on the market, the lamp body and the track are connected by directly utilizing a magnetic force, so that the lamp body may fall off or have poor connection between power-acquisition contacts or even drop off due to the principle of leverage or due to a shearing force generated by the magnetic force when the lamp body rotates or swings, which results in potential safety hazards.

SUMMARY

The examples of the present disclosure provide a magnetic connection structure and a lighting apparatus.

The examples of the present disclosure provide a magnetic connection structure for connecting a magnetically conductive track and a lighting device. The magnetic connection structure may include a first connection side and a second connection side capable of being engaged with each other; the first connection side may be provided with an anti-rotation protrusion, two connection grooves, and two first adsorption elements.

The connection groove may be arranged at both sides of the anti-rotation protrusion, the connection groove has an open end facing towards the second connection side and a closed end away from the second connection side; the anti-rotation protrusion may be protruded towards the second connection side and exceeds the open end of the connection groove; the first adsorption element is arranged in the corresponding connection groove and exposed in the corresponding connection groove.

The second connection side may be provided with an anti-rotation groove and two second adsorption elements, the anti-rotation groove is recessed in a direction away from the first connection side, the second adsorption element may be arranged at both sides of the anti-rotation groove and faces towards the first connection side; and when the first connection side is engaged with the second connection side, the anti-rotation protrusion may be inserted into the anti-rotation groove, the second adsorption element may be inserted into the connection groove and forms a magnetic adsorption with the first adsorption element.

The present disclosure further provides a lighting apparatus including a magnetically conductive track and a lighting device; wherein the lighting apparatus includes the magnetic connection structure described in any of the above, for magnetically connecting the magnetically conductive track and the lighting device.

The present disclosure further provides a lighting apparatus including a magnetically conductive track and a lighting device capable of being magnetically connected with each other.

The magnetically conductive track may be used for being assembled on an installation foundation, where the magnetically conductive track may include a mounting body, the mounting body has a mounting side and a first connection side arranged opposite to each other, the mounting side faces towards the installation foundation, and the first connection side may face towards the lighting device.

The first connection side may be provided with an anti-rotation protrusion, two connection grooves, and two first adsorption elements; where the connection groove may be arranged at both sides of the anti-rotation protrusion, the connection groove may have an open end facing towards the lighting device and a closed end away from the lighting device; the anti-rotation protrusion may be protruded towards the lighting device and exceeds the open end of the connection groove; the first adsorption element may be arranged in the corresponding connection groove and exposed in the corresponding connection groove.

The lighting device may include a base, the base has a lamp body side and a second connection side may be arranged opposite to each other, where the second connection side may face towards the first connection side, the second connection side may be provided with an anti-rotation groove and two second adsorption elements, the anti-rotation groove may be recessed into the base, and the second adsorption element may be arranged at both sides of the anti-rotation groove and may face towards the first connection side.

The first connection side and the second connection side may be engaged with each other, so that the anti-rotation protrusion may be inserted into the anti-rotation groove, the second adsorption element may be inserted into the connection groove and forms a magnetic adsorption with the first adsorption element.

It is to be understood that both the foregoing general description and the following detailed description are exemplary and explanatory only and are not restrictive of the present disclosure.

BRIEF DESCRIPTION OF THE DRAWINGS

The drawings described here are used to provide a further understanding of the present disclosure and constitute a part of the present disclosure. The illustrative examples of the present disclosure and their descriptions are used to explain the present disclosure and do not constitute an improper limitation of the present disclosure. In the drawings.

DETAILED DESCRIPTION

Figure 1:
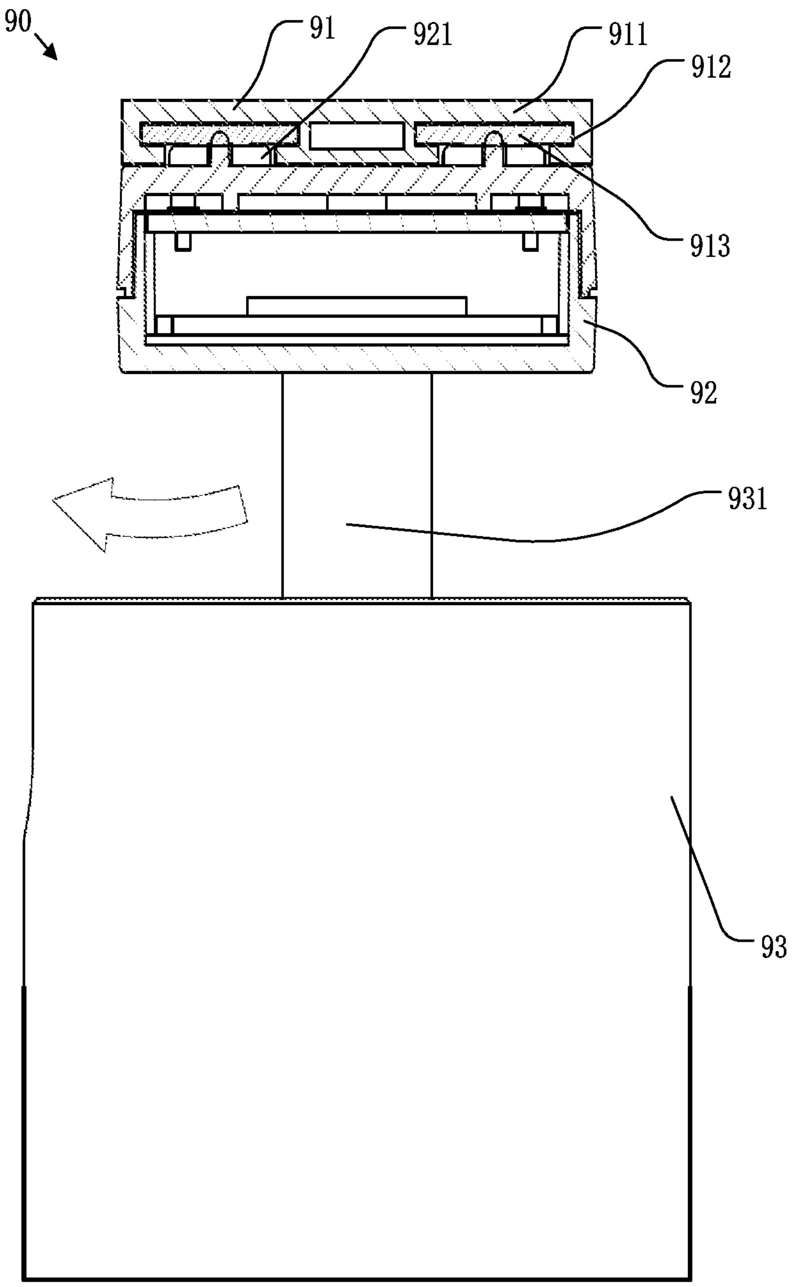
FIG. 1 is a schematic structural diagram of a lighting apparatus in the prior art.

In order to make objects, technical solutions and advantages of the present disclosure more apparent, the technical solutions of the present disclosure will be described in a clear and complete way in connection with examples and corresponding drawings. Apparently, the described examples are just a part but not all of the examples of the present disclosure. Based on the examples of the present disclosure, those ordinary skilled in the art can obtain all other example(s), without any inventive work, which should be within the scope of the present disclosure.

Reference Signs used in this disclosure may include:

base 1, lamp body 2, connecting rod 3,
screw nut 4, gasket 5, wire 6,
mounting body 10, mounting wall 11, first track wall 13,
second track wall 14, first adsorption element 20, magnetic adsorption layer 21,
insulating layer 22, conductive layer 23, second adsorption element 30,
elastic electrical contact 31, driving power source 40, magnetic connection structure 100,
first connection groove 101, second connection groove 102, anti-rotation protrusion 110,
mounting hole 111, anti-rotation groove 120, accommodating space 130,
first space 112, second space 113, first protrusion 131, second protrusion 121, third protrusion 141, fourth protrusion 122,
electric plug 200, conductive elastic piece 203, upper shell 210,
lower shell 220, sealing plug 300, screw head 301,
screw rod 302, first screw hole 303, fastener 304,
lighting apparatus 1000, magnetically conductive track 1001, lighting device 1002,
first connection side 1010, mounting side 1011, second connection side 1020, upper base 1021,
lower base 1022, insertion groove 1121, power-acquisition groove 1122,
baffle 1211, slot 1221.

The technical solutions provided by various examples of the present disclosure will be described in detail below with reference to the accompanying drawings.

Figure 2:
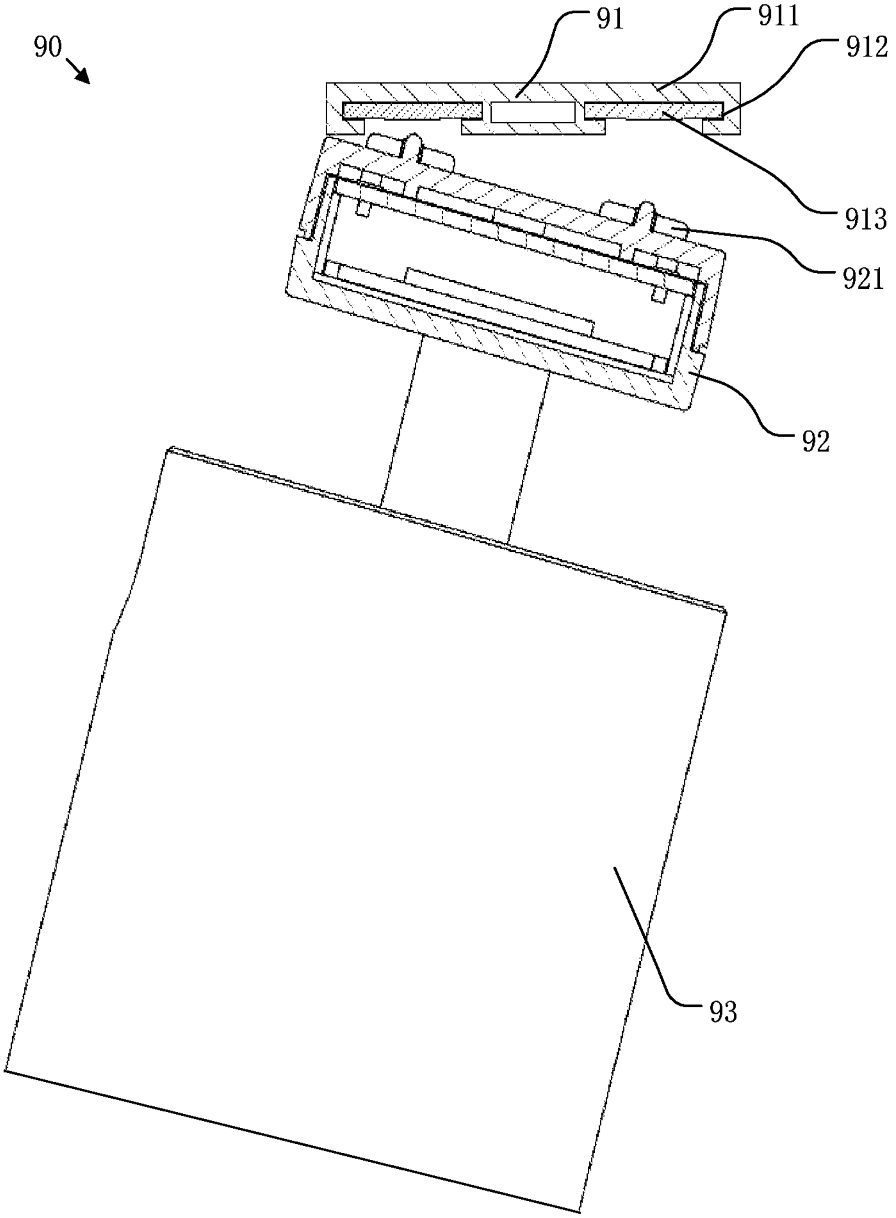
FIG. 2 is a schematic structural diagram of a lamp body dropping off due to a rotation of the lighting apparatus shown in FIG. 1.

As shown in FIG. 1, FIG. 1 is a schematic structural diagram of a lighting apparatus in the prior art. The lighting apparatus 90 includes a track 91, a base 92 and a lamp body 93; the track 91 is fixed on an installation foundation, the lamp body 93 is fixed on a lower surface of the base 92 through a connecting rod 931, and an upper surface of the base 92 is connected to the track 91 by means of magnetic adsorption, so as to realize the fixing of the lamp body 93. The track 91 includes a main body 911, and a cross section of the main body 911 is substantially in the shape of a flat plate along a width direction of the track 91. Two accommodating grooves 912 are recessed into a bottom surface of the main body 911, and the accommodating grooves 912 are arranged in parallel along a length direction of the track 91; a connecting component 913 is accommodated in each of the accommodating grooves 912, and the connecting component 913 includes a magnetic adsorption part and a conductive part. A magnetic iron 921 is arranged on the upper surface of the base 92, and the magnetic iron 921 is arranged in correspondence with the magnetic adsorption part of the connecting component 913. Since the main body 911 has a flat plate-like structure and a flushed lower surface, during the use of the lighting apparatus 90, in order to adjust the direction of light irradiation, the user will pull the lamp body 93 so that there will be a damping generated between the lamp body 93 and the connecting rod 931 arranged in the middle of the lamp body 93, which will cause a force to be applied on an upper part of the lamp body 93 when the lamp body 93 is pulled, and then cause the lamp body 93 to be rotated with relative to the track 91. Moreover, since the base 92 and the lamp body 93 have certain weights, the entire lamp body 93 is likely to be rotated with relative to the track 91 by a larger angle under the action of the gravity and an external force, which easily causes the magnetic iron 921 to be separated from the track 91; with the increase of the rotation angle, the magnetic force between the lamp body 93 and the track 91 decreases sharply, eventually causing the lamp body 93 to drop off, as shown in FIG. 2. Additionally, since power-acquisition contacts are formed between the magnetic iron 921 and the conductive part of the connecting component 913, the magnetic iron 921 will be separated from the track 91 during the swing of the lamp body 93, resulting in poor connection of the power-acquisition contacts.

Figure 7:
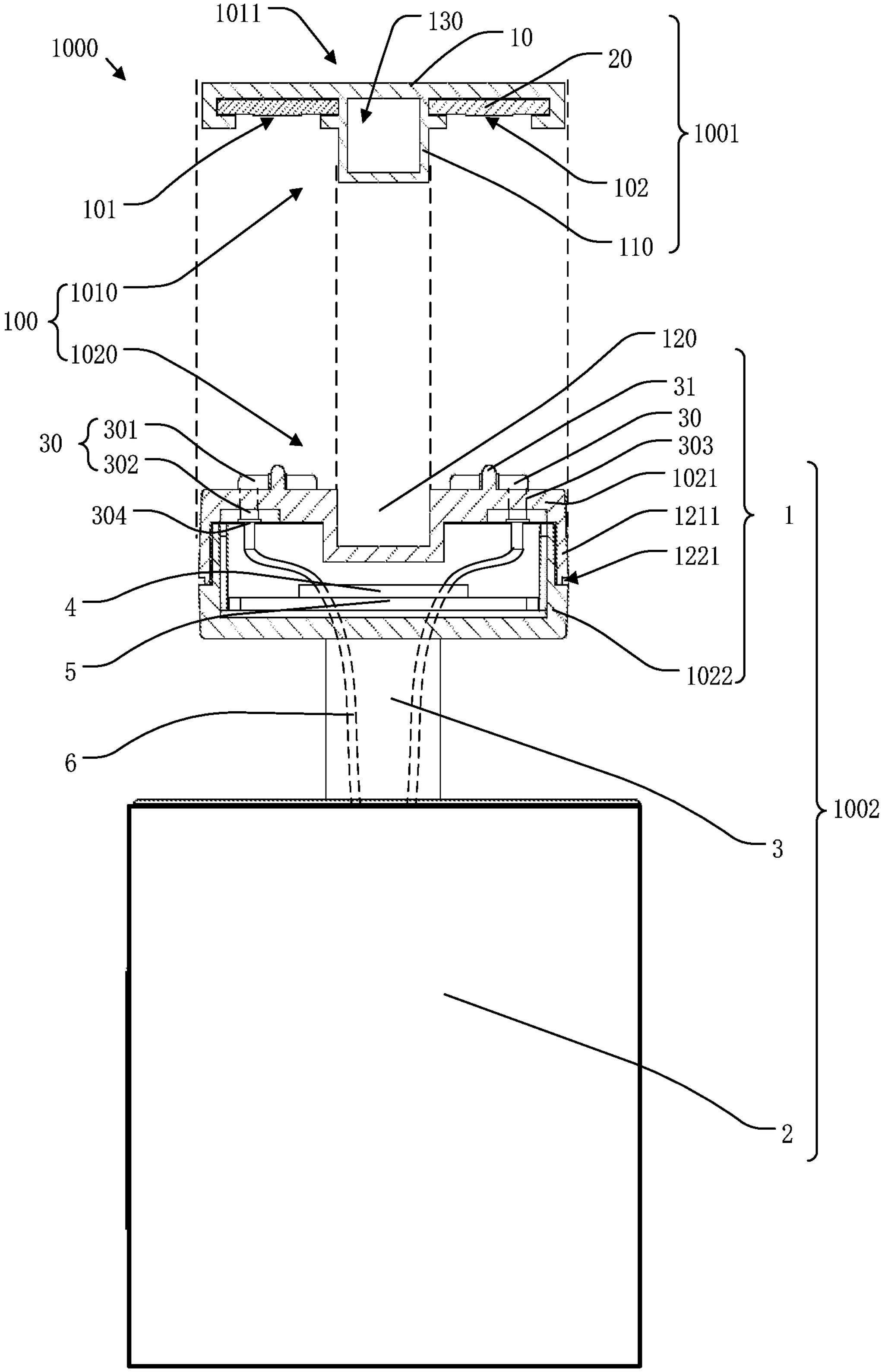
FIG. 7 a schematic diagram of a disassembled structure of a lighting apparatus provided by an example of the present disclosure.

As shown in FIG. 7, an example of the present disclosure discloses a lighting apparatus 1000, which includes a magnetically conductive track 1001 and a lighting device 1002; the lighting apparatus 1000 has a magnetic connection structure 100 for magnetically connecting the magnetically conductive track 1001 and the lighting device 1002.

As shown in FIG. 7, the magnetic connection structure 100 includes a first connection side 1010 and a second connection side 1020 that can be engaged with each other. The first connection side 1010 is provided on the magnetically conductive track 1001, and the second connection side 1020 is provided on the lighting device 1002.

Figure 3:
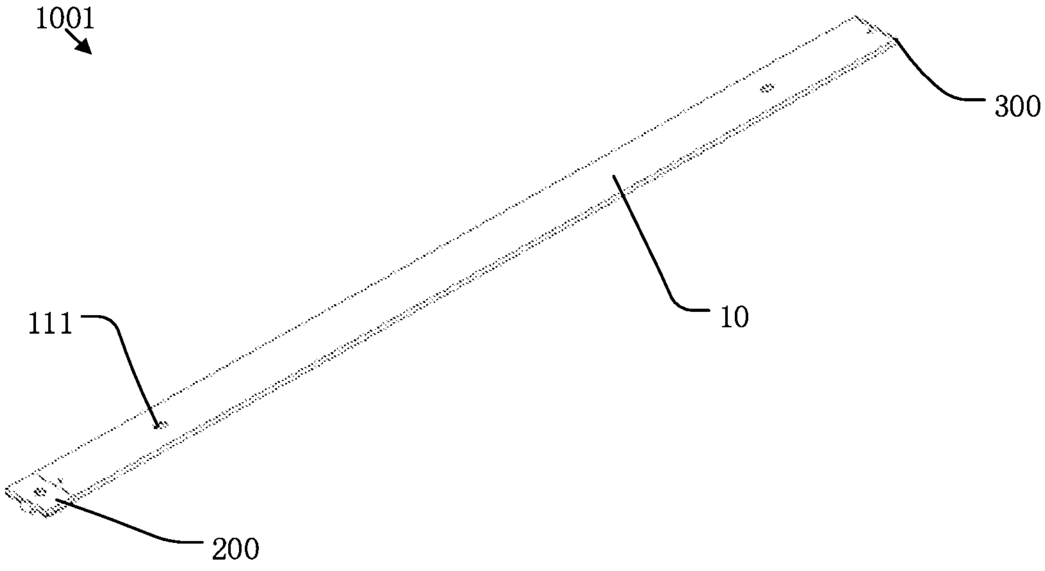
FIG. 3 is a perspective view of a magnetically conductive track provided in an example of the present disclosure.
Figure 4:
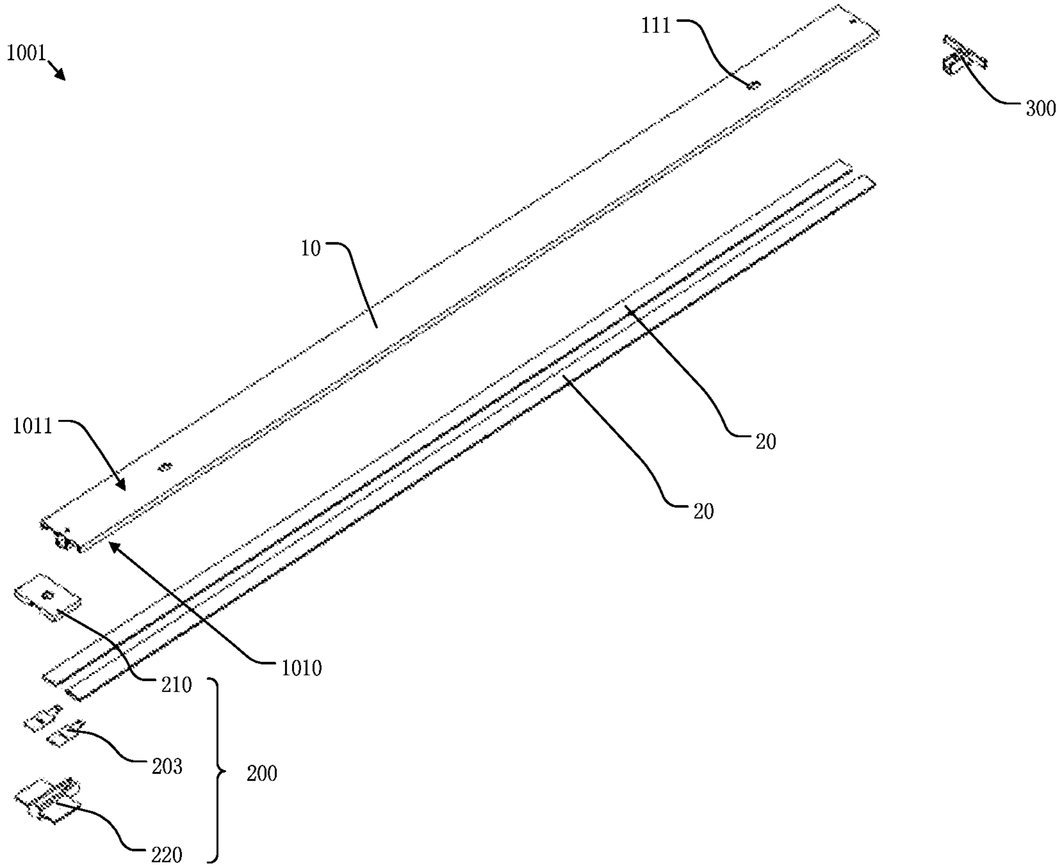
FIG. 4 is a schematic diagram of an explosive structure of the magnetically conductive track shown in FIG. 3.
Figure 5:
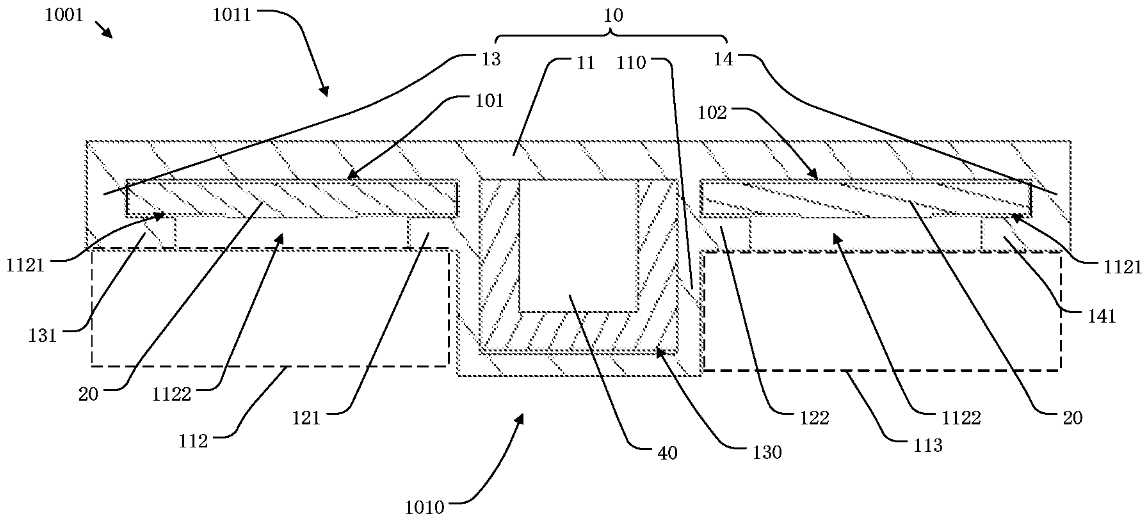
FIG. 5 is a cross-sectional view of a magnetically conductive track provided by an example of the present disclosure.

As shown in FIG. 3, FIG. 4 and FIG. 5, the magnetically conductive track 1001 includes a mounting body 10, the mounting body 10 has a mounting side 1011 and a first connection side 1010 arranged opposite to each other, the mounting side 1011 faces towards an installation foundation, and the first connection side 1010 faces towards the lighting device 1002.

In the example of the present disclosure, as shown in FIG. 5 and FIG. 7, the first connection side 1010 is provided with an anti-rotation protrusion 110, two connection grooves 101, 102, and two first adsorption elements 20; wherein the connection grooves 101, 102 are arranged at both sides of the anti-rotation protrusion 110, and are respectively a first connection groove 101 and a second connection groove 102; the first connection groove 101 and the second connection groove 102 each have an open end facing towards the second connection side 1020 and a closed end away from the second connection side 1020; the anti-rotation protrusion 110 is protruded towards the second connection side 1020 and exceeds the open end of the first connection groove 101 and the open end of the second connection groove 102; the first adsorption element is arranged in the corresponding first connection groove 101 or second connection groove 102 and exposed therein; the open end refers to an open bottom of the first connection groove 101 and an open bottom of the second connection groove 102; and the closed end refers to a top of the first connection groove 101 and a top of the second connection groove 102.

Figure 8:
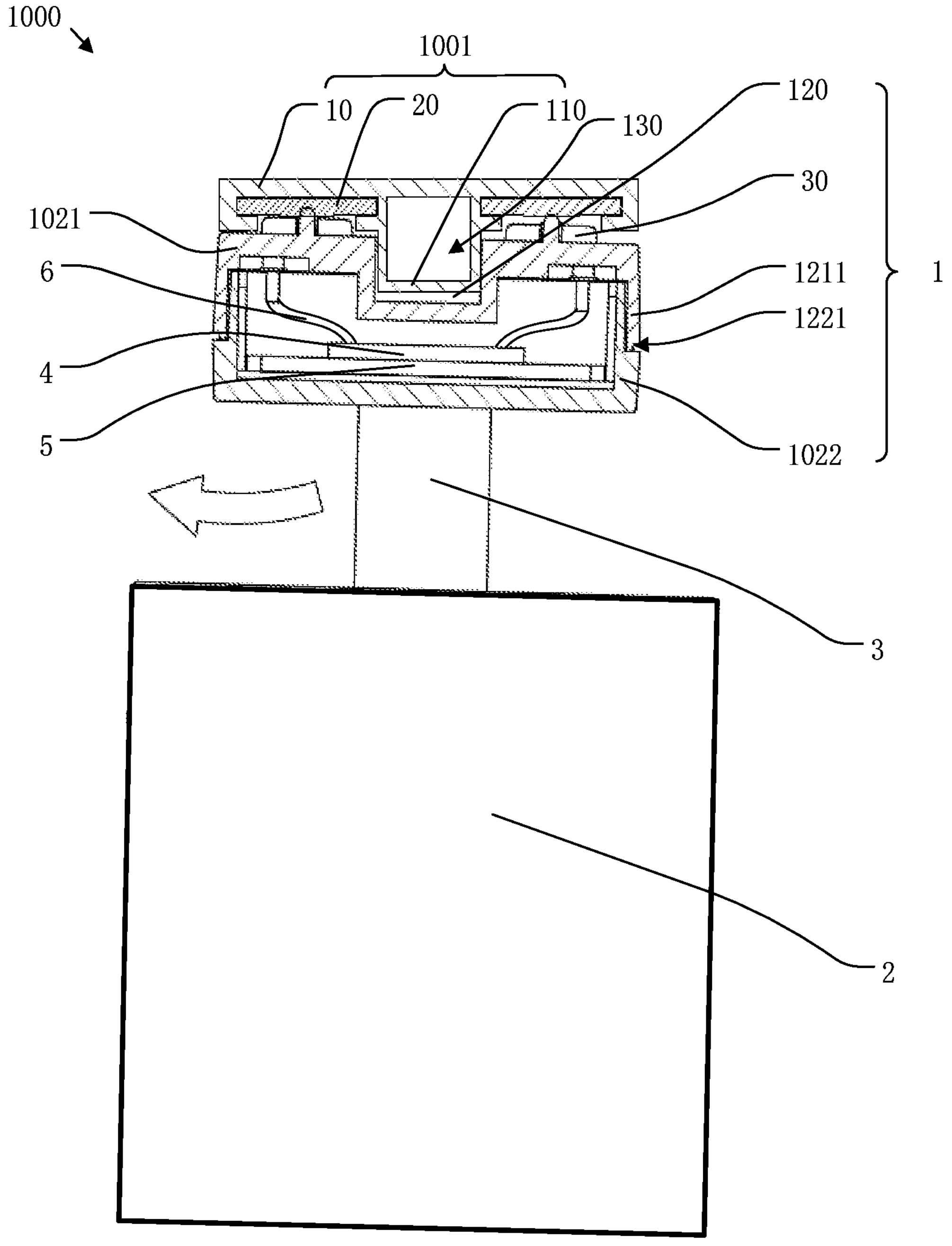
FIG. 8 is a schematic structural diagram of a lighting apparatus provided by an example of the present disclosure after engagement.

As shown in FIG. 7 and FIG. 8, the lighting device 1002 includes a base 1 and a lamp body 2, the base 1 has a lamp body side and a second connection side 1020 arranged opposite to each other, and the lamp body 2 is mounted at the lamp body side of the base 1; wherein the second connection side 1020 faces towards the first connection side 1010.

In the example of the present disclosure, as shown in FIG. 7 and FIG. 8, the second connection side 1020 is provided with an anti-rotation groove 120 and two second adsorption elements 30; wherein the anti-rotation groove 120 is recessed into the base 1, that is to say, the anti-rotation groove 120 is recessed in a direction away from the first connection side 1010; the anti-rotation groove 120 is snap-fitted with the anti-rotation protrusion 110 so as to prevent from a swing movement in the left and right directions, thereby achieving an anti-rotation effect. A depth of the anti-rotation groove 120 recessed into the second connection side 1020 is greater than or equal to a height of the anti-rotation protrusion 110 protruding from the first connection side 1010. The second adsorption element 30 is arranged at both sides of the anti-rotation groove 120 and faces towards the first connection side 1010; wherein the first connection side 1010 and the second connection side 1020 are engaged with each other in such a manner that, the anti-rotation protrusion 110 is inserted into the anti-rotation groove 120, and the second adsorption elements 30 are inserted into the first connection groove 101 and the second connection groove 102 and form a magnetic adsorption with the first adsorption elements 20.

When the first connection side 1010 is engaged with the second connection side 1020, the anti-rotation protrusion 110 is inserted into the anti-rotation groove 120, and the second adsorption elements 30 are inserted into the first connection groove 101 and the second connection groove 102 to form a magnetic adsorption with the first adsorption elements 20.

In this example, as shown in FIG. 5, the first connection groove 101 and the second connection groove 102 each include an insertion groove 1121 and a power-acquisition groove 1122 that are communicated with each other; the insertion groove 1121 is located at the closed end of the first connection groove 101 and the closed end of the second connection groove 102, and the power-acquisition groove 1122 is located at the open end of the first connection groove 101 and the open end of the second connection groove 102. That is to say, the power-acquisition groove 1122 faces towards the second connection side 1020 and is opened. The first adsorption element 20 is arranged in the corresponding insertion groove 1121 and is exposed in the power-acquisition groove 1122.

Figure 6:
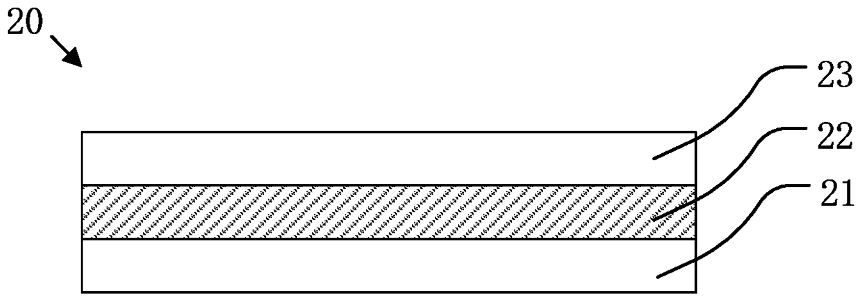
FIG. 6 is a schematic diagram of a layered structure of a conductive substrate provided by an example of the present disclosure.

As shown in FIG. 6, in this example, the first adsorption element 20 is a conductive substrate, and the conductive substrate includes a magnetic adsorption layer 21, an insulating layer 22 provided on the magnetic adsorption layer 21, and a conductive layer 23 provided on the insulating layer 22; wherein the conductive layer 23 faces towards the power-acquisition groove 1122 and is exposed therein, so that the lighting device 1002 can acquire electrical power. The conductive substrate 20 has a flat shape and extends along a length direction of the mounting body 10. Preferably, the conductive substrate 20 and the mounting body 10 are insulated from each other. In this example, the magnetic adsorption layer 21 is an iron-based layer; the conductive layer 23 is a conductive copper foil or a copper strip. It can be understood that, in other examples, the conductive substrate 20 can also be an iron substrate and have the functions of both of the conductive layer 23 and the magnetic adsorption layer 21.

In this example, the second adsorption element 30 is a magnetic iron block. When the first connection side 1010 is engaged with the second connection side 1020, the second adsorption element 30 is embedded into the power-acquisition groove 1122.

In this example, as shown in FIG. 7, the second connection side 1020 further includes two elastic electrical contacts 31 that respectively pass through the corresponding second adsorption elements 30 and extend towards the first adsorption elements 20; wherein the elastic electrical contact 31 is inserted into the power-acquisition groove 1122 to electrically connect the conductive layer 23 of the first adsorption element 20. Since the second adsorption element 30 is arranged to surround the elastic electrical contact 31, the second adsorption element 30 also has the function of protecting the elastic electrical contact 31.

In order to improve the anti-rotation effect of the anti-rotation groove 120, a ratio of an extension depth to a width of the anti-rotation groove 120 is configured such that, when the lighting device 1002 swings in the left and right directions on the magnetically conductive track 1001, the anti-rotation groove 120 is abutted against the anti-rotation protrusion 110 until the elastic electrical contact 31 at one side is detached from the first absorbing element 20, thereby preventing from a continuous rotation of the lighting device 1002.

Figure 9:
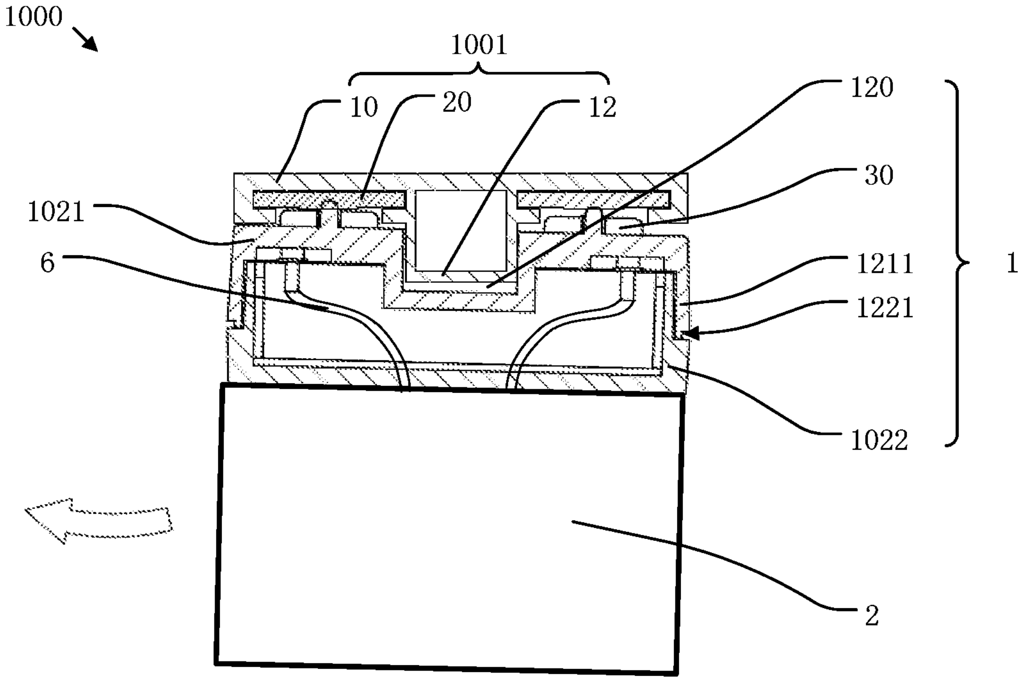
FIG. 9 is a schematic structural diagram of another lighting apparatus provided by an example of the present disclosure after engagement.

As shown in FIG. 6, FIG. 7 and FIG. 8, the conductive layer 23 is used for conducting electricity, so that the first adsorption element 20 is used for conducting electricity; the elastic electrical contact 31 and the first adsorption element 20 are used for conducting electricity, and the elastic electrical contact 31 is connected to the lighting device 1002 through the wire 6, so that an external driving power can supply power to the lighting device 1002 through the magnetically conductive track 1001. As shown in FIG. 9, in other examples, the base 1 and the lamp body 2 in the lighting device 1002 are arranged integrally; or, in other examples, the wire 6 may not be provided, and the base 1 and the lamp body 2 are connected through an adapter to form an integrated structure.

More specifically, as shown in FIG. 3 to FIG. 8, the mounting body 10 extends along a length direction and has a convex shape, and the mounting body 10 includes a mounting wall 11, an anti-rotation protrusion 110, a first track wall 13, and a second track wall 14; an upper surface of the mounting wall 11 is the mounting side 1011, and a lower surface of the mounting wall 11 is the first connection side 1010; the anti-rotation protrusion 110 is provided at the first connection side 1010; the first track wall 13 and the second track wall 14 are provided at the first connection side 1010, and the first track wall 13 and the second track wall 14 are arranged at both sides of the anti-rotation protrusion 110; the first connection groove 101 is formed between the first track wall 13 and the anti-rotation protrusion 110; the second connection groove 102 is formed between the anti-rotation protrusion 110 and the second track wall 14.

In this example, the anti-rotation protrusion 110, the first track wall 13, and the second track wall 14 are all vertically connected to the lower surface of the mounting wall 11; the mounting wall 11, the anti-rotation protrusion 110, the first track wall 13, and the second track wall 14 all extend along the length direction of the mounting body 10; the insertion grooves 1121 and the power-acquisition grooves 1122 of the first connection groove 101 and the second connection groove 102 are all parallel to the mounting wall 11. A top surface of the mounting wall 11 constitutes the mounting side 1011; a bottom surface of the anti-rotation protrusion 110, a bottom surface of the first track wall 13 and a bottom surface of the second track wall 14 jointly constitute the first connection side 1010, and the bottom surface of the anti-rotation protrusion 110 is lower than the bottom surface of the first track wall 13 and the bottom surface of the second track wall 14. Among which, the anti-rotation protrusion 110, the first track wall 13 and the second track wall 14 are connected to the lower surface of the mounting wall 11 and are spaced apart from each other. Specifically, the anti-rotation protrusion 110 is vertically connected with a middle part of the lower surface of the mounting wall 11; the first track wall 13 and the second track wall 14 are vertically connected with both sides of the lower surface of the mounting wall 11, and the first track wall 13 and the second track wall 14 are arranged parallel to each other; a first connection groove 101 extending along a length direction is formed between the first track wall 13 and the anti-rotation protrusion 110, and a second connection groove 102 extending along a length direction is formed between the anti-rotation protrusion 110 and the second track wall 14; a cross section of the anti-rotation protrusion 110 in a width direction of the mounting body 10 is in the shape of a square; the two first adsorption elements 20 are respectively arranged in the first connection groove 101 and the second connection groove 102.

The mounting wall 11 is located at the mounting side 1011 and is used for installing the mounting body 10 on the installation foundation; wherein as shown in FIG. 4, the mounting wall 11 is provided with at least two elliptical mounting holes 111 close to both ends thereof, and the number of the mounting holes 111 is set according to a length of the magnetically conductive track 1001. The mounting hole 111 is used for a screw to pass therethrough, and a screw head is finally pressed against both sides of the mounting hole 111 of the mounting wall 11 and locked with the installation foundation (the ceiling or the wall) so as to fix the magnetically conductive track 1001 on the installation foundation.

In this example, the first adsorption element 20 extends along a length direction and has a flat shape, and is insulated from the mounting body 10. Preferably, the first adsorption element 20 is an iron substrate, which serves as both a conductive element and a magnetic element; and the second adsorption element 30 is a magnetic iron. The first adsorption element 20 and the second adsorption element 30 are adsorbed with each other to conduct electricity as elastic power-acquisition contacts.

In this example, as shown in FIG. 5, the first track wall 13 is provided with a first protrusion 131, and the first protrusion 131 is arranged parallel to the mounting wall 11; the anti-rotation protrusion 110 is provided with a second protrusion 121, and the second protrusion 121 is arranged parallel to the mounting wall 11; the second protrusion 121 is arranged opposite to the first protrusion 131 to form the first connection groove 101.

In this example, as shown in FIG. 5, the second track wall 14 is provided with a third protrusion 141, and the third protrusion 141 is arranged parallel to the mounting wall 11; the anti-rotation protrusion 110 is provided with a fourth protrusion 122, and the fourth protrusion 122 is arranged parallel to the mounting wall 11; the fourth protrusion 122 is arranged opposite to the third protrusion 141 to form the second connection groove 102.

In this example, as shown in FIG. 5, a length of the first track wall 13 is equal to a length of the second track wall 14, and both are shorter than a length of the anti-rotation protrusion 110; a first space 112 for installing the lamp body 2 is formed between the anti-rotation protrusion 110 and the first track wall 13; a second space 113 for installing the lamp body 2 is formed between the anti-rotation protrusion 110 and the second track wall 14. The anti-rotation protrusion 110 is located between the first space 112 and the second space 113, thus forming a block that prevents from a relative rotation of the lamp body 2, i.e., preventing from a continuous rotation of the lamp body 2 with relative to the track; moreover, such small rotation will not cause the elastic power-acquisition contact to be detached from the track, so that the elastic power-acquisition contact is still within its elastic range without resulting in a sharp drop of the magnetic force, which finally ensures that a poor contact or a falling off will not be occurred during an adjustment process of the lamp body 2.

In this example, two ends of the mounting body 10 along the length direction are respectively formed with an insertion hole, and a cross section of the insertion hole in the width direction of the mounting body 10 is in the shape of a square.

Further, an electric plug 200 is clamped in any one of the insertion holes; wherein the electric plug 200 and the first adsorption elements 20 form an electrical connection at the end of the first connection groove 101 and the end of the second connection groove 102, respectively.

As shown in FIG. 4, in the example of the present disclosure, the electrical plug 200 is provided with a pair of conductive elastic pieces 203 at positions corresponding to the conductive substrates 20; the conductive elastic pieces 203 and the conductive substrates 20 can form an electrical connection at the end of the first connection groove 101 and the end of the second connection groove 102, respectively. When the electrical plug 200 is clamped in the insertion hole, the pair of conductive elastic pieces 203 are respectively connected to the ends of the pair of conductive substrates at the end of the first connection groove 101 and the end of the second connection groove 102, respectively.

In the example of the present disclosure, the electrical plug 200 includes an upper shell 210 and a lower shell 220; the upper shell 210 and the lower shell 220 have basically the same structure. The pair of conductive elastic pieces 203 are sandwiched and accommodated between the upper shell 210 and the lower shell 220.

Further, a sealing plug 300 is clamped in the other one of the insertion holes. An outer profile of the sealing plug 300 is as consistent as possible with that of the electrical plug 200.

As shown in FIG. 5, FIG. 7 and FIG. 8, in the example of the present disclosure, the anti-rotation protrusion 110 forms an accommodating space 130 between the two insertion holes in the length direction of the mounting body 10; when an internal driving mode is adopted, the magnetically conductive track 1001 further includes a driving power source 40, and the driving power source 40 is accommodated in the accommodating space 130. The driving power source 40 is electrically connected to the first adsorption element 20, and the conductive layer 23 is used for conducting electricity, so that the first adsorption element 20 is used for conducting electricity; the elastic electrical contact 31 and the first adsorption element 20 are used for conducting electricity, and the elastic electrical contact 31 is connected to the lighting device 1002 through the wire 6, so that the driving power source 40 can supply power to the lighting device 1002 through the magnetically conductive track 1001 via the wire 6.

An extension direction of the driving power source 40 is an extension direction of the length of the magnetically conductive track 1001. The driving power source 40 may include various circuit modules, a control module, a Bluetooth module or a WIFI module (the control module may be integrated with a Bluetooth module or a WIFI module).

In this example, the base 1 includes an upper base 1021 and a lower base 1022; the upper base 1021 is the upper surface of the base 1, and the lower base 1022 is the lower surface of the base 1; the upper base 1021 is provided with the anti-rotation groove 120 and the second adsorption element 30; at least two second adsorption elements 30 are provided, and the anti-rotation groove 120 is arranged between two adjacent second adsorption elements 30; the lower base 1022 is installed directly below the upper base 1021.

As shown in FIG. 7, FIG. 8 and FIG. 9, in this example, the second adsorption element 30 is a magnetic screw structure, including a screw head 301 and a screw rod 302; the upper base 1021 is provided with a first screw hole 303, the first screw hole 303 is arranged in correspondence with the first adsorption element 20; an upper surface of the lower base 1022 is provided with a fastener 304, and the wire 6 is arranged in correspondence with the first screw hole 303; the screw rod 302 passes through the first screw hole 303 and is screwed onto and tightened with the screw rod 302 by means of the fastener 304; and the wire 6 is electrically connected to a bottom of the screw rod 302.

In this example, as shown in FIG. 7 and FIG. 8, a baffle 1211 is respectively provided at both sides of the upper base 1021; an upper end side of the lower base 1022 is provided with a slot 1221, and the lower base 1022 is clamped between two baffles of the upper base 1021 through the slot 1221. The upper base 1021 and the lower base 1022 are assembled with each other to form a cross section in the shape of a square, and an operation cavity for installing the lamp body 2 is formed between the upper base 1021 and the lower base 1022.

As shown in FIG. 7 and FIG. 8, in this example, the lower surface of the base 1 is provided with a through hole (corresponding to the position of a connecting rod 3 below the screw nut 4); one end of the connecting rod 3 passes through the through hole to be fixed on the lower surface of the base 1 through the screw nut 4; the lamp body 2 is connected to the other end of the connecting rod 3. It can be understood that the screw nut 4 is located in the operation cavity, and the operation cavity facilitates tightening the screw nut 4.

As shown in FIG. 7 and FIG. 8, in this example, a gasket 5 is also provided between the screw nut 4 and the lower surface of the base 1, and an outer diameter of the gasket 5 is larger than that of the through hole. The screw nut 4 is screwed onto and tightened with the connecting rod 3, for fixing the connecting rod 3 to the through hole of the base; the gasket 5 can increase the contact area and strengthen the fixing between the screw nut 4 and the connecting rod 3; and a through hole for the wire 6 to pass through is provided at the center of the connecting rod 3 and the screw nut 4; in this way, the elastic electrical contact 31 is electrically connected to the lamp body 2 through the wire 6.

As shown in FIG. 9, in another example, the base 1 and the lamp body 2 in the lighting device 1002 are integrally arranged, or, the base 1 and the lamp body 2 are connected through an adapter to form an integrated structure. The adapter can realize an electrical connection, and is preferably a rotatable structure, so that the lamp body 2 can be rotated by an angle with relative to the base 1 to realize deflected light projection.

The above-described at least one technical solution adopted in the examples of the present disclosure can achieve the following beneficial effects.

According to the magnetic connection structure and the lighting apparatus provided by the examples of the present disclosure, the cooperation between the anti-rotation groove on the lamp body side and the anti-rotation protrusion on the magnetically conductive track is utilized, the first adsorption elements are adsorbed and fixed with the second adsorption elements, and two elastic electrical contacts are arranged on the second connection side, so that when the lamp body is pulled, there will be no large displacement between the anti-rotation groove and the anti-rotation protrusion, and the displacement can be kept within a range which ensures that the magnetic force will not be decreased; after a small rotation of the entire lamp body with relative to the track, the anti-rotation groove on the lamp body side interferes with the anti-rotation protrusion on the track, which prevents from a continuous rotation of the lamp body with relative to the track; furthermore, such small rotation will not cause the elastic power-acquisition contact to be detached from the track, so that the elastic power-acquisition contact is still within its elastic range without resulting in a sharp drop of the magnetic force drop, which finally ensures that the lamp body will not have poor contact or fall off during the adjustment process.

The examples of the present disclosure provide a magnetic connection structure and a lighting apparatus to solve the problem(s) in the existing magnetically conductive track lights that, since the lamp body and the track are connected by directly utilizing a magnetic force and the track is in the shape of a flat plate, the lamp body may fall off or have poor connection between power-acquisition contacts or even drop off due to the principle of leverage or due to a shearing force generated by the magnetic force when the lamp body rotates or swings, which results in potential safety hazards.

The examples of the present disclosure adopt the following technical solutions: a magnetic connection structure for connecting a magnetically conductive track and a lighting device, wherein the magnetic connection structure includes a first connection side and a second connection side capable of being engaged with each other; the first connection side is provided with an anti-rotation protrusion, two connection grooves, and two first adsorption elements; wherein the connection groove is arranged at both sides of the anti-rotation protrusion, the connection groove has an open end facing towards the second connection side and a closed end away from the second connection side; the anti-rotation protrusion is protruded towards the second connection side and exceeds the open end of the connection groove; the first adsorption element is arranged in the corresponding connection groove and exposed in the corresponding connection groove; the second connection side is provided with an anti-rotation groove and two second adsorption elements, the anti-rotation groove is recessed in a direction away from the first connection side, the second adsorption element is arranged at both sides of the anti-rotation groove and faces towards the first connection side; and when the first connection side is engaged with the second connection side, the anti-rotation protrusion is inserted into the anti-rotation groove, the second adsorption element is inserted into the connection groove and forms a magnetic adsorption with the first adsorption element.

Further, each of the connection grooves includes an insertion groove and a power-acquisition groove that are communicated with each other, the insertion groove is located at the closed end of the connection groove, and the power-acquisition groove is located at the open end of the connection groove; and the first adsorption element is arranged in the corresponding insertion groove and exposed in the power-acquisition groove.

Further, the first adsorption element is a conductive substrate, and the conductive substrate includes a magnetic adsorption layer, an insulting layer arranged on the magnetic adsorption layer, and a conductive layer arranged on the insulting layer; wherein the conductive layer faces towards the power-acquisition groove and is exposed in the power-acquisition groove.

Further, the second adsorption element is a magnetic iron block, and when the first connection side is engaged with the second connection side, the second adsorption element is embedded into the power-acquisition groove.

Further, the second connection side further includes two elastic electrical contacts passing through the corresponding second adsorption elements and extending towards the first adsorption elements, respectively; wherein the elastic electrical contact is inserted into the power-acquisition groove for electrically connecting the conductive layer of the first adsorption element.

The present disclosure further provides a lighting apparatus including a magnetically conductive track and a lighting device; wherein the lighting apparatus includes the magnetic connection structure described in any of the above, for magnetically connecting the magnetically conductive track and the lighting device.

The present disclosure further provides a lighting apparatus including a magnetically conductive track and a lighting device capable of being magnetically connected with each other; the magnetically conductive track is used for being assembled on an installation foundation, wherein the magnetically conductive track includes a mounting body, the mounting body has a mounting side and a first connection side arranged opposite to each other, the mounting side faces towards the installation foundation, the first connection side faces towards the lighting device; the first connection side is provided with an anti-rotation protrusion, two connection grooves, and two first adsorption elements.

The connection groove may be arranged at both sides of the anti-rotation protrusion, the connection groove has an open end facing towards the lighting device and a closed end away from the lighting device; the anti-rotation protrusion is protruded towards the lighting device and exceeds the open end of the connection groove; the first adsorption element is arranged in the corresponding connection groove and exposed in the corresponding connection groove; the lighting device includes a base, the base has a lamp body side and a second connection side arranged opposite to each other, wherein the second connection side faces towards the first connection side, the second connection side is provided with an anti-rotation groove and two second adsorption elements, the anti-rotation groove is recessed into the base, and the second adsorption element is arranged at both sides of the anti-rotation groove and faces towards the first connection side; wherein the first connection side and the second connection side are engaged with each other, so that the anti-rotation protrusion is inserted into the anti-rotation groove, the second adsorption element is inserted into the connection groove and forms a magnetic adsorption with the first adsorption element.

Further, the lighting device further includes a lamp body, the lamp body is connected to the lamp body side of the base through a connecting rod.

Further, the mounting body includes: a mounting wall, located at the mounting side and used for mounting the mounting body on the installation foundation; the connection grooves, located below the mounting wall; wherein each of the connection grooves includes an insertion groove and a power-acquisition groove communicated with each other, the insertion groove is located at the closed end of the connection groove, and the power-acquisition groove is located at the open end of the connection groove.

Further, the mounting body further includes: a first track wall and a second track wall; the first track wall and the second track wall are arranged at the first connection side, and the first track wall and the second track wall are arranged at both sides of the anti-rotation protrusion; wherein one of the connection grooves is formed between the first track wall and the anti-rotation protrusion; and the other one of the connection grooves is formed between the anti-rotation protrusion and the second track wall.

Further, the first adsorption element is a conductive substrate, the conductive substrate includes a magnetic adsorption layer, an insulting layer arranged on the magnetic adsorption layer, and a conductive layer arranged on the insulting layer; the first adsorption element is arranged in the corresponding connection groove, the conductive layer faces towards the power-acquisition groove and is exposed in the power-acquisition groove.

Further, the second adsorption element is a magnetic iron block, and the second adsorption element is embedded into the power-acquisition groove when the first connection side is engaged with the second connection side.

Further, the second connection side further includes two elastic electrical contacts passing through the corresponding second adsorption elements and extending towards the first adsorption elements, respectively; wherein the elastic electrical contact is inserted into the power-acquisition groove for electrically connecting the conductive layer of the first adsorption element.

Further, the base includes an upper base and a lower base; the upper base is provided with the anti-rotation groove and the second adsorption element; wherein at least two second adsorption elements are provided, and the anti-rotation groove is arranged between adjacent two second adsorption elements; and the lower base is mounted directly below the upper base.

Further, the second adsorption element is a magnetic screw structure including a screw head and a screw rod; the upper base is provided with a first screw hole, and the first screw hole is arranged in correspondence with the first adsorption element; an upper surface of the lower base is provided with a fastener, the screw rod passes through the first screw hole to be screwed onto and tightened with the screw rod by means of the fastener, and a wire is electrically connected to a bottom of the screw rod.

Further, a baffle is arranged at both sides of the upper base; an upper end side of the lower base is provided with a slot, and the lower base is clamped between two baffles of the upper base through the slot.

Further, a lower surface of the base is provided with a through hole; one end of a connecting rod passes through the through hole and is fixed on the lower surface of the base by means of a screw nut; the lamp body is connected with the other end of the connecting rod.

Further, the base and the lamp body are integrally arranged, or, the base and the lamp body are connected by an adapter to form an integral structure The at least one technical solution adopted by the examples of the present disclosure can achieve the following beneficial effects.

According to the magnetic connection structure and the lighting apparatus provided by the examples of the present disclosure, the cooperation between the anti-rotation groove on the lamp body side and the anti-rotation protrusion on the magnetically conductive track is utilized, the first adsorption elements are adsorbed and fixed with the second adsorption elements, and two elastic electrical contacts are arranged on the second connection side, so that when the lamp body is pulled, there will be no large displacement between the anti-rotation groove and the anti-rotation protrusion, and the displacement can be kept within a range which ensures that the magnetic force will not be decreased; after a small rotation of the entire lamp body with relative to the track, the anti-rotation groove on the lamp body side interferes with the anti-rotation protrusion on the track, which prevents from a continuous rotation of the lamp body with relative to the track; furthermore, such small rotation will not cause the elastic power-acquisition contact to be detached from the track, so that the elastic power-acquisition contact is still within its elastic range without resulting in a sharp drop of the magnetic force, which finally ensures that the lamp body will not have poor contact or fall off during the adjustment process.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The above are only examples of the present disclosure and are not used to limit the present disclosure. For those skilled in the art, various modifications and variations may be made to the present disclosure. Any modifications, equivalent substitutions, improvements, and the like made within the spirit and principles of the present disclosure shall be included in the scope of the present disclosure.

What is claimed is:

1. A magnetic connection structure for connecting a magnetically conductive track and a lighting device, comprising a first connection side and a second connection side capable of being engaged with each other, wherein:

the first connection side is provided with an anti-rotation protrusion, two connection grooves, and two first adsorption elements; wherein the connection groove is arranged at both sides of the anti-rotation protrusion, the connection groove has an open end facing towards the second connection side and a closed end away from the second connection side; the anti-rotation protrusion is protruded towards the second connection side and exceeds the open end of the connection groove; the first adsorption element is arranged in the corresponding connection groove and exposed in the corresponding connection groove; and the second connection side is provided with an anti-rotation groove and two second adsorption elements, the anti-rotation groove is recessed in a direction away from the first connection side, the second adsorption element is arranged at both sides of the anti-rotation groove and faces towards the first connection side; and when the first connection side is engaged with the second connection side, the anti-rotation protrusion is inserted into the anti-rotation groove, the second adsorption element is inserted into the connection groove and forms a magnetic adsorption with the first adsorption element, wherein each of the connection grooves comprises an insertion groove and a power-acquisition groove that are communicated with each other, the insertion groove is located at the closed end of the connection groove, and the power-acquisition groove is located at the open end of the connection groove; and the first adsorption element is arranged in the corresponding insertion groove and exposed in the power-acquisition groove.

2. The magnetic connection structure according to claim 1, wherein:

the first adsorption element is a conductive substrate, and the conductive substrate comprises a magnetic adsorption layer, an insulting layer arranged on the magnetic adsorption layer, and a conductive layer arranged on the insulting layer, wherein the conductive layer faces towards the power-acquisition groove and is exposed in the power-acquisition groove.

3. The magnetic connection structure according to claim 1, wherein:

the second adsorption element is a magnetic iron block, and when the first connection side is engaged with the second connection side, the second adsorption element is embedded into the power-acquisition groove.

4. The magnetic connection structure according to claim 1, wherein:

the second connection side further comprises two elastic electrical contacts passing through the corresponding second adsorption elements and extending towards the first adsorption elements; and the elastic electrical contact is inserted into the power-acquisition groove for electrically connecting the conductive layer of the first adsorption element.

5. A lighting apparatus, comprising a magnetically conductive track and a lighting device, wherein the lighting apparatus comprises the magnetic connection structure that is for magnetically connecting the magnetically conductive track and the lighting device, and the magnetic connection structure comprises a first connection side and a second connection side capable of being engaged with each other, wherein:

the first connection side is provided with an anti-rotation protrusion, two connection grooves, and two first adsorption elements; wherein the connection groove is arranged at both sides of the anti-rotation protrusion, the connection groove has an open end facing towards the second connection side and a closed end away from the second connection side; the anti-rotation protrusion is protruded towards the second connection side and exceeds the open end of the connection groove; the first adsorption element is arranged in the corresponding connection groove and exposed in the corresponding connection groove; and the second connection side is provided with an anti-rotation groove and two second adsorption elements, the anti-rotation groove is recessed in a direction away from the first connection side, the second adsorption element is arranged at both sides of the anti-rotation groove and faces towards the first connection side; and when the first connection side is engaged with the second connection side, the anti-rotation protrusion is inserted into the anti-rotation groove, the second adsorption element is inserted into the connection groove and forms a magnetic adsorption with the first adsorption element, wherein each of the connection grooves comprises an insertion groove and a power-acquisition groove that are communicated with each other, the insertion groove is located at the closed end of the connection groove, and the power-acquisition groove is located at the open end of the connection groove; and the first adsorption element is arranged in the corresponding insertion groove and exposed in the power-acquisition groove.

6. A lighting apparatus, comprising a magnetically conductive track and a lighting device capable of being magnetically connected with each other; wherein the magnetically conductive track is used for being assembled on an installation foundation, wherein the magnetically conductive track comprises a mounting body, the mounting body has a mounting side and a first connection side arranged opposite to each other, the mounting side faces towards the installation foundation, the first connection side faces towards the lighting device; the first connection side is provided with an anti-rotation protrusion, two connection grooves, and two first adsorption elements; wherein the connection groove is arranged at both sides of the anti-rotation protrusion, the connection groove has an open end facing towards the lighting device and a closed end away from the lighting device; the anti-rotation protrusion is protruded towards the lighting device and exceeds the open end of the connection groove; the first adsorption element is arranged in the corresponding connection groove and exposed in the corresponding connection groove;

the lighting device comprises a base, the base has a lamp body side and a second connection side arranged opposite to each other, wherein the second connection side faces towards the first connection side, the second connection side is provided with an anti-rotation groove and two second adsorption elements, the anti-rotation groove is recessed into the base, and the second adsorption element is arranged at both sides of the anti-rotation groove and faces towards the first connection side; and wherein the first connection side and the second connection side are engaged with each other, so that the anti-rotation protrusion is inserted into the anti-rotation groove, the second adsorption element is inserted into the connection groove and forms a magnetic adsorption with the first adsorption element;

wherein the lighting device further comprises a lamp body, the lamp body is connected to the lamp body side of the base through a connecting rod.

7. The lighting apparatus according to claim 6, wherein:

the mounting body comprises: a mounting wall, located at the mounting side and used for mounting the mounting body on the installation foundation; and the connection grooves, located below the mounting wall; wherein each of the connection grooves comprises an insertion groove and a power-acquisition groove communicated with each other, the insertion groove is located at the closed end of the connection groove, and the power-acquisition groove is located at the open end of the connection groove.

8. The lighting apparatus according to claim 7, wherein:

the mounting body further comprises: a first track wall and a second track wall; and the first track wall and the second track wall are arranged at the first connection side, and the first track wall and the second track wall are arranged at both sides of the anti-rotation protrusion; and wherein one of the connection grooves is formed between the first track wall and the anti-rotation protrusion; and the other one of the connection grooves is formed between the anti-rotation protrusion and the second track wall.

9. The lighting apparatus according to claim 7, wherein:

the first adsorption element is a conductive substrate, the conductive substrate comprises a magnetic adsorption layer, an insulting layer arranged on the magnetic adsorption layer, and a conductive layer arranged on the insulting layer; and the first adsorption element is arranged in the corresponding connection groove, the conductive layer faces towards the power-acquisition groove and is exposed in the power-acquisition groove.

10. The lighting apparatus according to claim 7, wherein the second adsorption element is a magnetic iron block, and the second adsorption element is embedded into the power-acquisition groove when the first connection side is engaged with the second connection side.

11. The lighting apparatus according to claim 10, wherein:

the second connection side further comprises two elastic electrical contacts passing through the corresponding second adsorption elements and extending towards the first adsorption elements; and wherein the elastic electrical contact is inserted into the power-acquisition groove for electrically connecting the conductive layer of the first adsorption element.

12. The lighting apparatus according to claim 6, wherein the base comprises:

an upper base provided with the anti-rotation groove and the second adsorption element; wherein at least two second adsorption elements are provided, and the anti-rotation groove is arranged between adjacent two second adsorption elements; and a lower base mounted directly below the upper base.

13. The lighting apparatus according to claim 12, wherein:

the second adsorption element is a magnetic screw structure comprising a screw head and a screw rod;

the upper base is provided with a first screw hole, and the first screw hole is arranged in correspondence with the first adsorption element;

an upper surface of the lower base is provided with a fastener, the screw rod passes through the first screw hole to be screwed onto and tightened with the screw rod by means of the fastener, and a wire is electrically connected to a bottom of the screw rod; or a baffle is arranged at both sides of the upper base;

an upper end side of the lower base is provided with a slot, and the lower base is clamped between two baffles of the upper base through the slot; or, a lower surface of the base is provided with a through hole; one end of a connecting rod passes through the through hole and is fixed on the lower surface of the base by means of a screw nut; the lamp body is connected with the other end of the connecting rod; or, the base and the lamp body are integrally arranged, or, the base and the lamp body are connected by an adapter to form an integral structure.

* * * * *